(12) United States Patent
Tan

(10) Patent No.: US 10,479,021 B2
(45) Date of Patent: Nov. 19, 2019

(54) CURVED PLATE PRODUCTION BY ADDITIVE LAYER MANUFACTURE

(71) Applicant: ROLLS-ROYCE plc, London (GB)

(72) Inventor: Matthew Tan, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 16/044,859

(22) Filed: Jul. 25, 2018

(65) Prior Publication Data

US 2019/0030824 A1 Jan. 31, 2019

(30) Foreign Application Priority Data

Jul. 26, 2017 (GB) .................................. 1712002.3

(51) Int. Cl.
| | | |
|---|---|---|
| *B29C 64/40* | (2017.01) | |
| *B22F 3/105* | (2006.01) | |
| *B29C 64/153* | (2017.01) | |
| *B33Y 10/00* | (2015.01) | |
| *B33Y 80/00* | (2015.01) | |
| *B29L 7/00* | (2006.01) | |
| *B29L 31/00* | (2006.01) | |

(52) U.S. Cl.
CPC ............ *B29C 64/40* (2017.08); *B22F 3/1055* (2013.01); *B29C 64/153* (2017.08); *B33Y 10/00* (2014.12); *B22F 2003/1058* (2013.01); *B29L 2007/002* (2013.01); *B29L 2031/7739* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 2016/0059315 A1 | 3/2016 | Baudimont | |
| 2016/0271699 A1* | 9/2016 | Illston | .................. B22F 3/1055 |
| 2016/0332259 A1 | 11/2016 | Jones et al. | |
| 2017/0232518 A1* | 8/2017 | Shi | .......................... B22F 3/105 |
| | | | 419/7 |
| 2018/0111334 A1* | 4/2018 | Gold | ..................... B29C 64/153 |
| 2018/0169954 A1* | 6/2018 | Kendrick | .............. B29C 64/393 |

OTHER PUBLICATIONS

Great Britain Search Report dated Nov. 16, 2017, in GB Patent Application No. 1712002.3.

* cited by examiner

*Primary Examiner* — Mary Lynn F Theisen
(74) *Attorney, Agent, or Firm* — Duane Morris LLP

(57) ABSTRACT

A method of producing a curved plate by additive layer manufacture is provided. The method includes building up the plate layer-by-layer such that a first layer forms a bottom edge of the plate and the plate is additively extended upwards therefrom by subsequent layers such that a last layer forms an opposing top edge of the plate. In this way, spaced, first and second lateral edges of the plate each grow layer-by-layer to extend between respective ends of the bottom and top edges. The plate thus built up arches over from the bottom edge to adopt a curved shape on cross-sections through the plate normal to the bottom edge.

7 Claims, 3 Drawing Sheets

CURVED PLATE PRODUCTION BY ADDITIVE LAYER MANUFACTURE

CROSS-REFERENCE TO RELATED APPLICATIONS

This application is based upon and claims the benefit of priority from British Patent Application No. GB 1712002.3, filed on 26 Jul. 2017, the entire contents of which are incorporated by reference.

BACKGROUND

Technical Field

The present disclosure relates to a method of producing a curved plate by additive layer manufacture.

Description of the Related Art Additive layer manufacturing (ALM) is a technology that enables the fabrication of complex, near net shape components by deposition of many layers of one or more specific materials. For example, powder bed ALM constructs components layer by layer by depositing powder on a machine bed or base/build plate and then selectively consolidating or fusing the powder using an energy beam such as a laser or an electron beam. The powder deposition/consolidation steps are repeated to produce a three dimensional component.

A significant advantage of ALM is reducing the amount of material that needs to be purchased in order to manufacture a final part. This is particularly important for high value-added materials as typically used in the aerospace industry. Also ALM components can have performance and weight advantages over components manufactured by more traditional methods.

However, residual stress and distortion are significant problems when producing a part by ALM. Distortion of the part can cause fit-up problems during assembly, and reduce the dimensional accuracy of the final product. In addition the stresses can have a detrimental effect on the mechanical properties of the part.

An ALM part may be in the form of a plate, and in particular a plate having double curvatures. When built up from a bottom edge by ALM, the resulting plate inevitably arches over that bottom edge. A problem can then arise in that this arching may produce distortions along particularly the lateral edges of the plate which extend upwards from the ends of the bottom edge. FIG. 1 shows a result of finite element modelling of a plate 100 produced by ALM by deposition of layers on a base 101, the direction and locations of the principal distortions being indicated by arrows.

To limit this distortion, structures can be placed to increase stiffness in the direction parallel to the preferential mode of distortion. For example, FIG. 2 shows a cross-sectional view at mid-height through the plate 100 of FIG. 1 on a plane normal to direction z. The black arrows indicate the principal distortions, and the grey features 102 indicate the possible locations of support structures to counter these distortions. However, even using such structures, permanent distortion along the lateral edges may not be avoided. This can be a particular problem if the lateral edges are required to carry fine features.

SUMMARY

Accordingly, the present disclosure provides a method of producing a curved plate by additive layer manufacture, the method including:

building up the plate layer-by-layer such that a first layer forms a bottom edge of the plate and the plate is additively extended upwards therefrom by subsequent layers such that a last layer forms an opposing top edge of the plate, wherein spaced, first and second lateral edges of the plate each grow layer-by-layer to extend between respective ends of the bottom and top edges, and the plate thus built up arches over from the bottom edge to adopt a curved shape on cross-sections through the plate normal to the bottom edge;

simultaneously building up layer-by-layer with the plate first and second sacrificial plate additions along respectively the first and second lateral edges, each sacrificial plate addition continuing the geometry of the plate beyond its lateral edge such that the additions also arch over from the bottom edge to adopt a curved shape on cross-sections through the additions normal to the bottom edge; and removing the sacrificial plate additions.

Advantageously, by adding sacrificial material in the form of the additions which continue the geometry of the plate rather than by providing supports or sacrificial material in the direction of distortion, it is possible to displace any distortions into the additions, where they are then removed from the final plate. In other words, instead of attempting to eliminate unwanted distortions, the method moves them to a safe place.

The method may have any one or, to the extent that they are compatible, any combination of the following optional features.

The sacrificial plate additions may be thinned where they join to the plate along the first and second lateral edges. In this way the subsequent removal of the additions may be facilitated.

The length of each sacrificial plate addition in the direction of the bottom edge may be at least 5% of the length of the bottom edge, and preferably at least 10% of the length of the bottom edge. In general, the length of each sacrificial plate addition can be set so as to ensure that the inflection points of a distortion are located at the junctions of the lateral edges and the sacrificial plate additions. Increasing the length of each sacrificial plate addition in this direction can move more distortion out of the finished plate. However, increasing the length by too much wastes material. Therefore, the length of each sacrificial plate addition in the direction of the bottom edge may be at most 30% of the length of the bottom edge, and preferably at most 20% of the length of the bottom edge.

The spacing between the first and second lateral edges and/or the spacing between the bottom and top edges may be at least 10 or 15 times greater than the thickness of the plate.

One or each of the sacrificial plate additions may be anchored during plate build up by further additive layer material to a respective support structure. Thus it is possible to combine the sacrificial approach and the support approach to reducing or eliminating distortions.

The plate thus built up typically also has a curved shape on cross-sections normal to the direction of additive layer growth, i.e. the plate typically has double curvatures. However, this does not exclude that the plate may only have a curved shape on cross-sections through the additions normal to the bottom edge, i.e. may have a single curvature.

DESCRIPTION OF THE DRAWINGS

Embodiments of the present disclosure will now be described by way of example with reference to the accompanying drawings in which.

DETAILED DESCRIPTION

Figure 3:
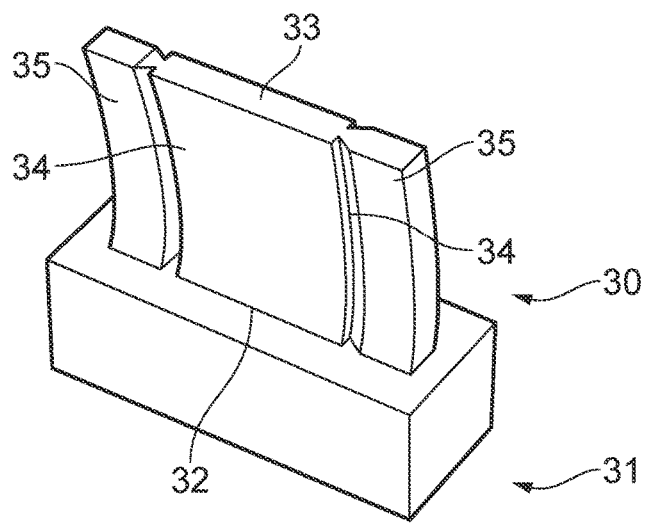
FIG. 3 shows schematically a plate as built up from a base by ALM.

FIG. 3 shows schematically a plate 30 built up from a base 31 by ALM. The plate 30 has a bottom edge 32 formed by the first ALM layer, and is additively extended upwards therefrom by subsequent layers to a top edge 33 formed by the last ALM layer. The plate has a curved shape on cross-sections through the plate normal to the bottom edge and consequently arches over the bottom edge. First and second lateral edges 34 of the plate extend between the bottom and top edges and join via thinned regions to respective sacrificial additions 35 which are built up by ALM simultaneously with the plate and continue the arched geometry of the plate beyond its lateral edges. Typically, the spacings between the first and second lateral edges and between the bottom and top edges are at least ten times greater than the thickness of the plate.

The sacrificial material in the additions 35 behaves as an extension of the plate geometry so that distortions and plastic deformation which would otherwise occur along the lateral edges 34 are displaced to the additions, which are then removed after the ALM process, e.g. by machining.

Figure 1:
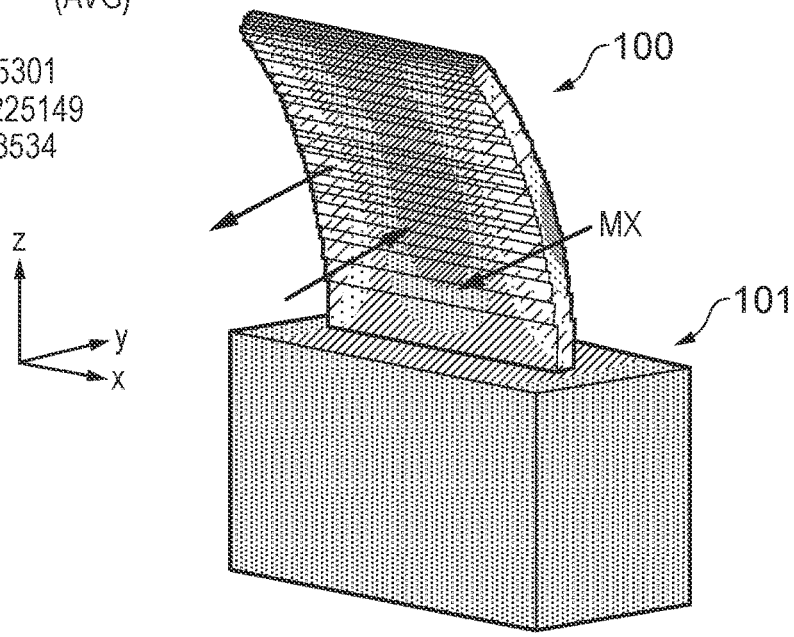
FIG. 1 shows a result of finite element modelling of a plate produced by additive layer manufacturing (ALM)
Figure 2:
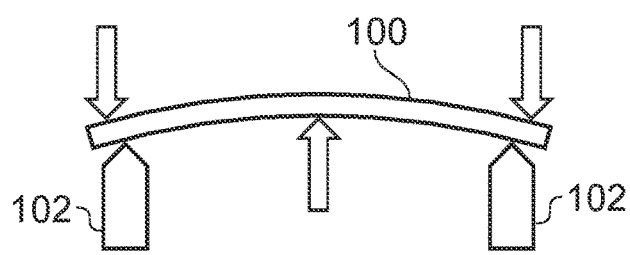
FIG. 2 shows a cross-sectional view at mid-height through the plate of FIG. 1 on a plane normal to direction z.
Figure 4:
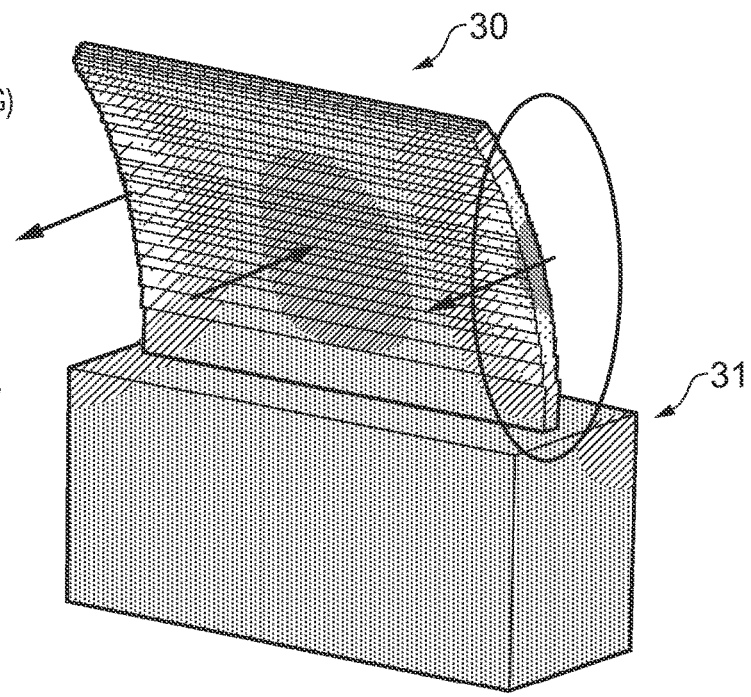
FIG. 4 shows a result of finite element modelling of the plate of FIG. 4.

For example, FIG. 4 shows a result of finite element modelling of the plate 30, the direction and locations of the principal distortions being indicated by arrows. Relative to the modelling result of FIG. 1, the displacement of the edge distortions is evident. Such modelling can also be used to show that plastic strains are similarly displaced.

The length of each sacrificial addition 35 in the direction of the bottom edge 32 can be in the range of from 5% to 30% of the length of the bottom edge. The lower limit is generally enough to ensure that most distortions are displaced to the addition, and the upper limit can avoid excessive material wastage.

An advantage of this ALM method is that it is possible to avoid making contact onto critical surfaces of the plate 30 with stiffening supports.

Figure 5:
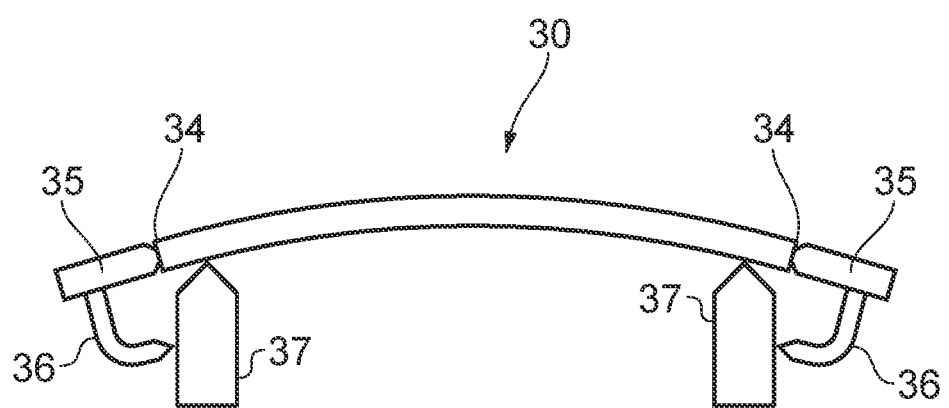
FIG. 5 shows a cross-sectional view at mid-height through a variant of the plate of FIG. 3 and FIG. 4 on a plane normal to direction z.

Moreover, relative to conventional approaches which attempt to combat distortions and plastic deformation by use of such stiffening supports, the ALM method can advantageously use lower volumes of sacrificial material and can better isolate of plastic deformations away from potentially sensitive locations (e.g. along the lateral edges 34). However, this does not exclude the adoption of a combined approach. Thus FIG. 5 shows a cross-sectional view at mid-height through a variant of the plate 30 on a plane normal to direction z. To supplement the sacrificial additions 35, members 36 produced by ALM extend therefrom and locate against support structures 37, which also make supporting contact with the plate 30 adjacent the lateral edges 34.

The ALM method can advantageously be applied to the production of any ALM component with such an arched geometry.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of producing a curved plate by additive layer manufacture, the method including:
   building up the plate layer-by-layer such that a first layer forms a bottom edge of the plate and the plate is additively extended upwards therefrom by subsequent layers such that a last layer forms an opposing top edge of the plate, wherein spaced, first and second lateral edges of the plate each grow layer-by-layer to extend between respective ends of the bottom and top edges, and the plate thus built up arches over from the bottom edge to adopt a curved shape on cross-sections through the plate normal to the bottom edge;
   simultaneously building up layer-by-layer with the plate first and second sacrificial plate additions along respectively the first and second lateral edges, each sacrificial plate addition continuing the geometry of the plate beyond its lateral edge such that the additions also arch over from the bottom edge to adopt a curved shape on cross-sections through the additions normal to the bottom edge; and
   removing the sacrificial plate additions.

2. A method of producing a curved plate according to claim 1, wherein the sacrificial plate additions are thinned where they join to the plate along the first and second lateral edges.

3. A method of producing a curved plate according to claim 1, wherein the length of each sacrificial plate addition in the direction of the bottom edge is at least 5% of the length of the bottom edge.

4. A method of producing a curved plate according to claim 1, wherein the length of each sacrificial plate addition in the direction of the bottom edge is at most 30% of the length of the bottom edge.

5. A method of producing a curved plate according to claim 1, wherein the spacing between the first and second lateral edges and/or the spacing between the bottom and top edges is at least ten times greater than the thickness of the plate.

6. A method of producing a curved plate according to claim 1, wherein one or each of the sacrificial plate additions is anchored during plate build up by further additive layer material to a respective support structure.

7. A method of producing a curved plate according to claim 1, wherein the plate thus built up also has a curved shape on cross-sections normal to the direction of additive layer growth.

* * * * *